L. KELCHER.
WIND SHIELD FOR MOTOR CARS.
APPLICATION FILED JUNE 26, 1917.
1,292,797. Patented Jan. 28, 1919.
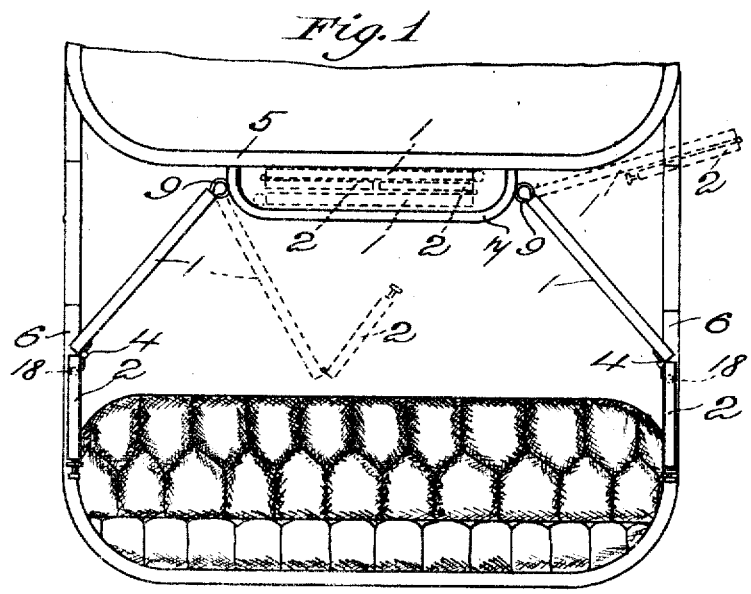
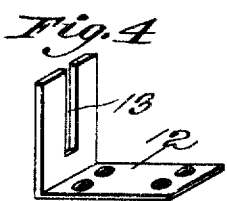
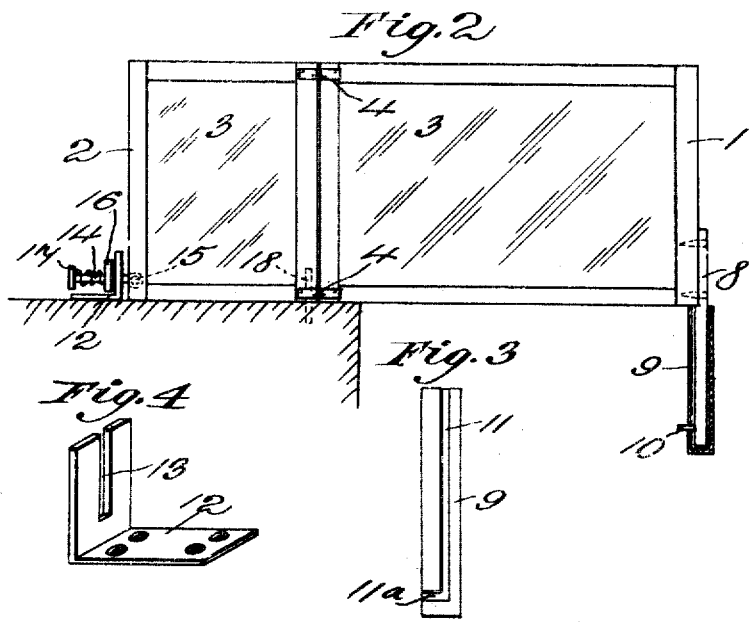
INVENTOR:
Leonard Kelcher
ATTY

UNITED STATES PATENT OFFICE.

LEONARD KELCHER, OF HAKATARAMEA, NEW ZEALAND.

WIND-SHIELD FOR MOTOR-CARS.

1,292,797.　　　　　　Specification of Letters Patent.　　Patented Jan. 28, 1919.

Application filed June 26, 1917.　Serial No. 176,946.

*To all whom it may concern:*

Be it known that I, LEONARD KELCHER, a subject of the King of Great Britain, residing at Hakataramea, in the Province of Canterbury, Dominion of New Zealand, have invented new and useful Improvements in Wind-Shields for Motor-Cars, of which the following is a specification.

This invention relates to wind-shields or screens for protecting the passengers accommodated upon the rear seat of a motor-car or the like, its object being to provide a simple and inexpensive construction which will serve the purpose in an efficient and convenient manner.

It has been found in practice that the ordinary front wind-screen mounted upon the dash of the car effectively protects the passengers upon the rear seat from the direct rush of air occasioned by the travel of the car or a head-wind. In doing this however, the said wind-screen, and to a certain extent the body of the car tends to produce a suction or partial vacuum in rear of such wind-screen which reacts in causing the air currents which strike the rear passengers from either side of the car.

It is the object of the present invention, therefore, to provide a means for deflecting these cross currents of air, and thus effectively protect the rear passengers without introducing the objection of an increased wind resistance and the resulting increase in the expenditure of fuel occasioned by the rear wind-shields hitherto employed, while a further advantage of the present invention lies in its simplicity and cheapness of cost.

In order that the nature of the invention may be fully understood, reference will now be made to the accompanying sheet of drawings, in which:—

Figure 1— is a plan view of the rear portion of a car, showing in full lines the invention in the operative position, and indicating also in dotted lines the same device as it would appear when hinged back to give access to the doors and when dismounted and packed away in the car.

Fig. 2— is a side elevation illustrating by way of example, a practical method of mounting the device, Fig. 3— is a detail view showing a means for mounting the device at its forward end, and Fig. 4— is a detail view of the bracket or lug employed for securing the rear end of the device to the side of the car.

In carrying the invention into effect, the construction comprises a pair of side wind-shields or wings, each comprising two frames, 1 and 2 glazed with glass, celluloid or other transparent material 3, and which frames are hingeably connected together end-for-end by means of suitable hinges 4.

The members 1 of the said windshields are attached at their forward edges to the back of the front seat 5 of the car at two points positioned a suitable distance apart, and such portions 1 extend at an angle outwardly and rearwardly to meet the sides 6 of the car, while the members 2 continue rearwardly in line with such sides, as clearly illustrated in Fig. 1.

The said windshields are so arranged that when not required for use, they may be dismounted and placed in a suitable box or receptacle. As here shown, a box 7 is provided and secured to the back of the front seat 5, in which case, such box may, if desired, to provide with the means for mounting the forward ends of the windshields instead of mounting such directly upon the seat 5.

To permit of the said wind-shields being conveniently folded so as to occupy a minimum of space in the box, the rear members 2 are made of approximately half the width of the forward members 1, which arrangement permits of the wings when folded, being so placed in the box that the two members 2 will be in line with one another, and will therefore occupy together the same space as each of the portions 1, as indicated in dotted lines, Fig. 1.

As here shown, the means provided for attaching each of the said wings at its forward end comprises a rod or shank 8 secured to the forward end of the portion 1 of such flap and extending downwardly therefrom, such shank being received within a suitable socket 9 mounted upon the back of the seat 5 or other convenient point adjacent thereto, such as the box 7 as here shown. For the purpose of securing it firmly in place and preventing it from being accidentally withdrawn, the said shank 8 is provided with a pin or projection 10 which extends outwardly therefrom, and is received within a slot 11 formed in the socket 9. The said slot 11 extends downwardly in a vertical direction from the top of the socket and is formed at its lower end with a horizontal extension 11ª. By this construction, the shank, having been inserted in the socket, the action of turning the member 1 of the wing outward into the required position to meet the side of the car, as shown in Fig. 1, will cause the pin 10 to enter the portion 11ª of the slot, and so lock the shank after the manner of a bayonet-joint.

For the purpose of securing the rear end of the wing in place, a bracket or lug 12 may be provided upon the upper edge of the side of the car, the upwardly projecting portion of such lug being formed with a vertical slot 13, adapted to receive a pin or shank 14, projecting from the rear edge of the member 2 of the wing, as shown in Figs. 1 and 2. For the purpose of permitting it to be so inserted in a convenient manner, the said shank 14 is hingeably attached or pivoted as by means of a pin 15 to the frame of the member 2 so as to permit of such shank turning in an upward or downward direction, while to prevent looseness and rattling in the joint, a collar 16 is slidably arranged upon the shank and caused to bear against the rear face of the lug 12 by the action of a spring 17.

To enable the flap at the point of junction of the members 1 and 2, to be secured to the side of the car, an ordinary door-bolt 18 may be provided upon one or other of such members, and a suitable hole provided at the required position in the side of the car to receive it as indicated in Fig. 2.

The above-described methods of fixing are, however, to be understood as by way of example only, and the invention is not therefore to be limited to such, but to a pair of side wind-shields of the nature described and suitably mounted in the specified position and relation to one another and the car.

I claim:

In combination, a two seated vehicle body, a receptacle for storing wind-shields secured to the rear of the front seat of the body, sockets formed with bayonet-slots fixed to said receptacle, a pair of wind-shields each comprising a large screen and a relatively small screen hinged to the large screen, a rod fixed to each of the large screens and rotatably mounted in said sockets, pins formed on said rods and slidable in said slots, means for securing the hinged edges of the smaller screens to the sides of the body, and antirattling means for securing the free ends of the small screens to the sides of the body.

Signed at Christchurch, N. Z., this 22nd day of February, 1917, in the presence of two witnesses.

LEONARD KELCHER.

Witnesses:
PERCY RICHMOND CLIMIE,
CYRIL CARLYN COATES.